Dec. 15, 1931.  C. SAUZEDDE  1,836,818

WIRE SPOKE LACING FOR WHEELS

Filed June 14, 1926

Inventor
Claude Sauzedde,
By
Attorneys

Patented Dec. 15, 1931

1,836,818

UNITED STATES PATENT OFFICE

CLAUDE SAUZEDDE, OF DETROIT, MICHIGAN

WIRE SPOKE LACING FOR WHEELS

Application filed June 14, 1926. Serial No. 115,777.

This invention relates to wire spoke lacing for wheels particularly wheels used for supporting or traction purposes in connection with tractors, trucks, busses and other kinds of automobiles; airplanes, bicycles and other vehicles.

My invention aims to provide a wire wheel wherein a novel arrangement of spokes affords a substantial support for a rim relative to a hub and resists side thrusts, so that the wheel structure is comparatively rigid, yet possesses that degree of resiliency found advantageous compared to wooden spoke wheels.

My invention further aims to provide a wheel of the above type wherein the wire spokes are tangentially disposed relative to the wheel hub in the plane of wheel rotation. The spokes are arranged in three conical formations with two of the formations numerically intersecting, and the spokes so distributed in these formations so that two of said formations will be the equivalent of the third formation. All the spoke formations cooperate in providing the trussed structure between a tire supporting rim and the hub of a wheel, so that lateral shifting of the rim relative to the hub is practically impossible under the stresses and strains incident to vehicular travel with heavy loads.

My invention further aims to provide a wire spoke wheel wherein the spokes are arranged in sets, with the spokes of each set of equal length. All of the spokes are disposed at similar tangents relative to a hub for supporting a rim, and there is a uniform angularity of the spokes assuring a rigid structure.

My invention still further aims to provide a wire spoke wheel in which the spoke arrangement affords a maximum clearance for a brake drum within the wheel structure, and it is by virtue of such clearance that a powerful brake mechanism may be employed, especially a large and wide brake drum with a maximum braking surface.

Figure 1:
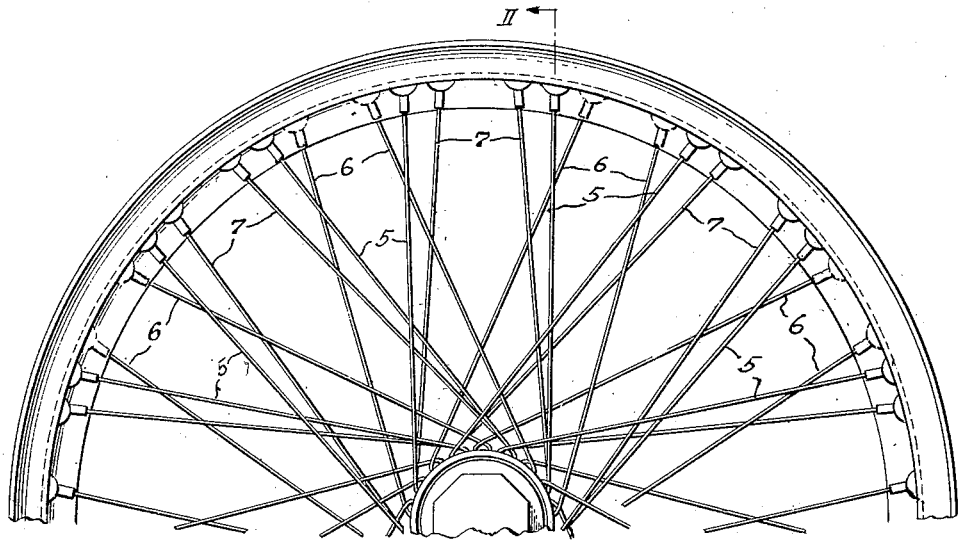
Figure 2:
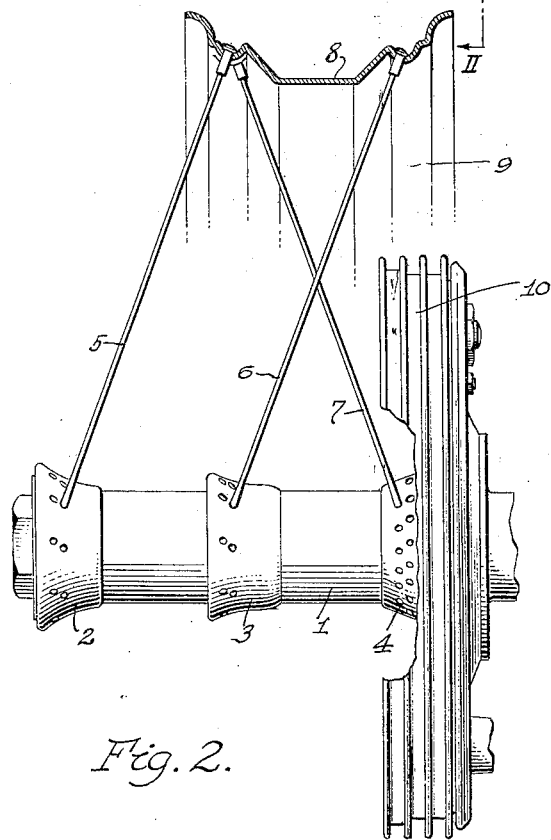

My invention will be hereinafter specifically described and then claimed, and reference will now be had to the drawings, wherein Figure 1 is a side elevation of a portion of a wheel in accordance with this invention; and Fig. 2 is a vertical cross sectional view taken on the line II—II of Fig. 1.

In the drawings, the reference numeral 1 denotes a wheel hub having apertured frusto-conical shaped annular anchoring members 2, 3 and 4 for the inner hook shaped ends of three series of spokes 5, 6 and 7, all of which are tangentially disposed relative to the hub 1 in the plane of wheel rotation. The outer ends of all of the spokes are suitably connected to a tire supporting rim 8, and reference will now be had to the arrangement of said spokes.

The series of spokes 5 have the inner ends thereof anchored in the member 2 and said spokes extend outwardly and inwardly from the outer end of the hub 1 with the outer ends of said spokes anchored adjacent the outer edge of the rim 8. This arrangement of spokes provides a conical formation, and a similar formation is that of the spokes 6, which have the inner ends connected to the anchoring member 3, while the outer ends of the spokes 6 are connected to the rim 8 contiguous to the inner edge of said rim. Considering the spokes 5 and 6 as shown in Fig. 2, the spokes may be said to be in parallelism with the inner series of spokes 6 between parallel planes of the side edges of the rim 8, while the series of spokes 5 intersect the outer side plane of the rim 8 and extend to the outer end of the hub 1.

The series of spokes 7 are arranged the reverse of the spokes 6 and the inner ends of the spokes 7 are connected to the anchoring member 4 and extend outwardly to intersect the conical surface generated by the spokes 6, so that the outer ends of the spokes 7 may be connected to the rim 8, adjacent the outer side edge thereof.

The number of spokes 7 is substantially equivalent to the combined number of spokes 5 and 6, so that the series of spokes 7 may resist as great an outward lateral pressure on the rim 8 as the lateral inward pressure exerted on the combined spokes 5 and 6. Considering the spokes 5, 6 and 7 shown in Fig. 2, as a set, it will be noted that the angularity and the length are uniform. The spokes 7 cooperate with the spokes 6 in supporting the rim 8 relative to the hub 1, and the two conical formations of these spokes afford an interlacing to provide a substantial fabricated structure between the rim and hub. Of course the outer series of spokes 5 may cooperate with the spokes 6 and 7 for resisting radial pressure, but the conical arrangement of the outer spokes 5 is to resist lateral stresses and strains, so that the rim 8 is positively tied to the hub without any danger of one shifting co-axially of the other.

It will also be noted that the distribution of the inner ends of the spokes 5, 6 and 7 is such as to provide a long bearing on the hub 1, the length of the bearing being greater than the width of the rim 8, and it is in this connection that the rim 8 cannot be tilted or otherwise bodily shifted out of its defined position or plane of rotation at a right angle to the longitudinal axis of the hub 1.

Again considering the spokes 6 and 7, it will be seen in Fig. 2 that there is a wide and radial clearance 9 for a brake drum 10 mounted on the hub. It is therefore possible to use a wide and large brake drum to obtain maximum braking area or surface for a brake band.

I attach considerable importance to the conical formations of the spokes, and their specific arrangement between a wheel hub and rim, yet desire it to be understood that my invention is not limited to any particular type of wheel hub, wheel rim, or spoke anchoring means.

What I claim is:—

1. In a wheel structure, a hub, a rim, and three series of spokes of equal length connecting said hub and rim, two of said series of spokes being disposed in parallel planes, and the other series of spokes crossing that first named series which is nearer said other series at the hub, the crossing occurring at substantially the mid points of the spokes of one of said series.

2. In a wheel structure, a hub, a rim, and three series of spokes connecting said hub and rim, two of said series of spokes being disposed in parallel planes, and the other series of spokes intersecting the plane of one of the other series of spokes, the number of spokes in the first two mentioned series being approximate to the number of spokes in the last mentioned series.

3. In a wheel structure, a hub, a rim, a conical formation of spokes connecting the outer end of said hub to the outer edge of said rim, a conical formation of spokes connecting an intermediate portion of said hub to the inner edge of said rim, and a conical formation of spokes connecting the inner end of said hub to the outer edge of said rim, the number of spokes in the last mentioned formation being equal to the number of spokes in the first two formations.

4. A wheel structure as called for in claim 3, wherein the last two mentioned conical formations intersect each other.

5. A wheel structure as called for in claim 3, wherein the last two mentioned conical formations are within the lateral planes of the rim and the first mentioned conical formation of spokes is anchored to the hub outside of the outer lateral plane of the rim.

6. In a wheel structure, a hub, a rim, and three series of spokes of equal length connecting said hub and rim, two of said series of spokes being disposed in parallel planes, and the other series of spokes crossing one of the first named series of spokes, one of the parallel series of spokes being anchored to the hub outside of the outer lateral plane of said rim.

In testimony whereof I affix my signature.

CLAUDE SAUZEDDE.